United States Patent [19]

Kurihara et al.

[11] Patent Number: 5,901,278
[45] Date of Patent: May 4, 1999

[54] IMAGE RECORDING APPARATUS WITH A MEMORY MEANS TO STORE IMAGE DATA

[75] Inventors: Susumu Kurihara; Utami Soma, both of Hachioji, Japan

[73] Assignee: Konica Corporation, Tokyo, Japan

[21] Appl. No.: 08/813,871

[22] Filed: Mar. 7, 1997

Related U.S. Application Data

[63] Continuation of application No. 08/514,783, Aug. 14, 1995, abandoned.

[30] Foreign Application Priority Data

Aug. 18, 1994 [JP] Japan .................................. 6-194165
Aug. 25, 1994 [JP] Japan .................................. 6-200992

[51] Int. Cl.⁶ .............................. B41B 15/00; H04N 1/40
[52] U.S. Cl. ......................... 395/114; 395/115; 358/404; 358/444; 358/468
[58] Field of Search ..................... 358/444, 426, 358/433, 404, 442, 468, 434, 437, 441, 406; 395/849, 856, 733, 734, 739, 112, 113, 114, 115, 116; 711/156, 150

[56] References Cited

U.S. PATENT DOCUMENTS

| | | | |
|---|---|---|---|
| 4,160,279 | 7/1979 | Fuwa ......................................... | 358/288 |
| 4,692,894 | 9/1987 | Bemis ........................................ | 395/877 |
| 4,748,514 | 5/1988 | Bell ............................................ | 358/288 |
| 4,774,590 | 9/1988 | Haganuma .............................. | 358/444 |
| 4,884,147 | 11/1989 | Arimoto et al. .......................... | 358/443 |
| 5,129,048 | 7/1992 | Ng .............................................. | 395/110 |
| 5,184,229 | 2/1993 | Saito et al. ............................... | 358/427 |
| 5,193,171 | 3/1993 | Shinmura et al. ....................... | 711/113 |
| 5,212,566 | 5/1993 | U et al. ..................................... | 358/444 |
| 5,227,876 | 7/1993 | Cucchi et al. ........................... | 370/235 |
| 5,253,078 | 10/1993 | Balkanski et al. ....................... | 358/426 |

FOREIGN PATENT DOCUMENTS 63-38462 3/1988 Japan .

*Primary Examiner*—Edward L. Coles
*Assistant Examiner*—Madeleine Au Nguyen
*Attorney, Agent, or Firm*—Frishauf, Holtz, Goodman, Langer & Chick

[57] ABSTRACT

A copier for recording images of plural documents on recording sheets. The copier includes: a scanner for reading the images of the documents by photoelectrically converting the images so as to obtain image data corresponding to the images; a document feeder for sequentially feeding the documents to the scanner; a memory for storing the image data, including plural data compression/expansion circuits for compressing and expanding the image data, a selector for selecting one of the plural data compression/expansion circuits, and a memory member for storing the image data compressed by the selected one of the plural data compression/expansion circuits; a printer for forming images, corresponding to the selected image data from the memory, on the recording sheets; and a controller circuit for generating memory data overflow signals when a remaining area of the memory member is not more than a predetermined value. The controller also controls the document feeder, the scanner, and the memory in response to the memory data overflow signals so that the scanner stops reading the images, the memory changes a compression ratio of the image data to a higher ratio, the document feeder feeds back the documents to an original order, and reads the documents from a first one.

9 Claims, 10 Drawing Sheets

IMAGE RECORDING APPARATUS WITH A MEMORY MEANS TO STORE IMAGE DATA

This application is a Continuation of application Ser. No. 08/514,783, filed Aug. 14, 1995, abandoned.

BACKGROUND OF THE INVENTION

The present invention relates to an electrophotographic copier, and more specifically, to an apparatus in which: a document image is photoelectrically converted into image data; the image data is compression processed; the processed data is temporarily stored in a memory means and then read out; and the image is recorded according to the read-out image data.

The following recording apparatus in which: a document image is read out; the read-out image data is compression processed and stored in a memory; the stored image data is sequentially read out and an image is formed, instead of the image formation in which a document image is directly projected onto a photoreceptor of an image forming apparatus; and, when an insufficient memory capacity remains in the apparatus, image data storing in the memory is stopped, and an alarm is activated, is disclosed in Japanese Utility Model Open to Public Inspection No. 38462/1988.

When image data is written into an image data storing memory, the larger the data compression ratio is, the smaller the required memory capacity needs to be. However the reproduced image quality is proportionately deteriorated.

In contrast to this, the smaller the data compression ratio is, the larger the required memory capacity needs to be, although deterioration of the reproduced image quality is at a minimum.

The data memory capacity required for a single sheet of document differs greatly depending on the kind of image, for example, a photographic image or a character image. Accordingly, the required memory capacity can not be determined until the image is actually read. Normally, the data compression ratio in the memory apparatus is previously set such that the image quality is not adversely affected. However, since the memory capacity installed in this kind of recording apparatus is limited, it can not be avoided that the writable memory capacity may be reduced to zero at the time of image data writing in the memory, that is, when memory data overflows the memory capacity.

When memory data overflows, the structure disclosed in the foregoing Japanese Utility Model is adopted in the apparatus.

In this case, when the memory data overflow alarm is noted by the operator, he had to manually change the data compression ratio, and the order of documents to be read out was returned to the initial one so that the image data reading operation into the memory was repeated.

In cases where the number of document sheets is reduced and the image data reading operation into the memory is carried out again from the first when the memory data overflow occurred, the following operations are carried out. When the documents are single sided and are fed in such a manner that the image surfaces are right side up and the stacked documents are fed sequentially from the top to bottom, the number of document sheets can be reduced easily. However, when the documents are fed in such a manner that the image surfaces are right side down in single sided documents and the stacked documents are fed sequentially from the bottom to top, or when the documents are double sided, the number of the document sheets can not be reduced easily. In such cases, when the operations are not carefully performed, there is a possibility that pages are missed, or the documents are read in such a manner that the document sheets are out of sequence. Accordingly, a longer period of time is necessary for the re-arrangement of the copied sheets.

Further recently, there is a tendency that the following method of using an image recording apparatus is becoming popular in order to increase the productivity of copying operation. The method is that the process of reading a document and simultaneously storing the obtained image data in a memory and the process of reading a document and simultaneously making an copy by performing a image forming operation are parallelly executed. In this case, when the number of the copying set is one, the storing operation in the memory and the copying operation of the image data are completed immediately. When the number of the necessary copying sets is N (N is an integer not less than 2), the rest of the copying sets, the number of which is N−1, is provided by reading out the image data from the memory, in which the image data are already stored, and forming the image accordingly. When the aforementioned copying method is used, the recovery operation from memory overflow takes unexpected effort.

SUMMARY OF THE INVENTION

On the other hand, in cases where the data compression ratio is changed, and the order of the document sheets are returned to the initial one so that data reading operation is repeated from the first when memory data overflow occurred, the operator can not be away from the recording apparatus during the above operations. Accordingly, manpower saving for the above operations is desired.

In view of the foregoing, the first objective of the present invention is to provide a recording apparatus in which it is not necessary that the total number of the document sheets be reduced; and image data is automatically read in the memory, without manual operations.

Further, the second objective of the present invention is to provide a recording apparatus, in which an operator can specify the data compression ratio so as to reproduce a high quality image, and which can be more easily operated.

In view of the forgoing, the third objective of the present invention is to provide a recording apparatus in which the number of documents is not required to be decreased and the storing operation of the image data in a memory is automatically executed without an operator when memory overflow occurs.

An image recording apparatus according to the first embodiment, which realizes the above first objectives, includes: a reading means for reading a document image by photoelectric conversion so as to obtain image data; an automatic document feeding apparatus for automatically feeding the documents sequentially to the reading means; an image data memory means for storing the image data; an image forming means for forming an image according to the image data which is selectively read from the image data memory means; and a control section for controlling the automatic document feeding apparatus, the image data storing means and the image forming means, in which the image data memory means is composed of plural data compression/expansion means for compressing/expanding image data by different compression ratios, a selection means for selecting one of plural compression/expansion means, and a memory for storing therein the compressed image data, and the control section monitors the available memory capacity and a memory data overflow signal is activated when the available memory capacity is reduced to a predetermined value setting.

Here, the automatic document feeding apparatus is preferably a circulation type automatic document feeding apparatus.

Further, it is preferable that the control section of the image recording apparatus stops document reading and activates an alarm according to the memory data overflow signal generated by the memory monitoring means; further, the compression ratio is automatically changed to increase the value; and the order of the document sheets is automatically returned to the initial order from the first sheet so that the document reading can be repeated.

On the other hand, the image recording apparatus of the second embodiment, which realizes the above second objective, is structured such that: the apparatus includes: a reading means for reading a document image by photoelectric conversion so as to obtain image data; an automatic document feeding apparatus for automatically feeding the document sequentially to the reading means; an image data memory means for storing therein the image data; an image forming means for forming an image according to the image data which is selectively read from the image data memory means; and a control section for controlling the automatic document feeding apparatus, the image data memory means and the image forming means, wherein the image data memory means is comprised of a plurality of data compression/expansion means for compressing/expanding image data by different compression ratios, a selection means for selecting one of a plurality of compression/expansion means, and a memory for storing therein the compressed image data, and the control section has an operation section which can specify a manual selection mode for manually selecting the compression ratio, and an automatic selection mode for automatically selecting the compression ratio, and monitors the available memory capacity and when the available memory capacity is reduced to a predetermined value setting, a memory data overflow signal is activated.

Here, the automatic document feeding apparatus is preferably a circulation type automatic document feeding apparatus.

Further, the control section of the image recording apparatus is preferably structured such that: it stops document reading according to the memory data overflow signal generated by the memory monitoring means; when the operation section is in the manual selection mode for the compression ratio, the control section activates an alarm and is ready for the next operation; and when the operation section is in the automatic selection mode for the compression ratio, an alarm is displayed, and the compression ratio is automatically changed to increase its value; and further, the order of the document sheets is returned to its initial order from the first sheet so that document reading can be repeated.

On the other hand, the third embodiment which realizes the third objective includes: a reading means for reading the document image by photoelectric conversion so as to obtain image data; an automatic document feeding apparatus for automatically feeding the documents sequentially to the reading means; an image data memory means for storing the image data; an image forming means for forming an image according to the image data which is selectively read from the image data memory means; a post-processing means for distributing the recording sheets on which the image is formed; and a control section for controlling the automatic document feeding apparatus, the image data storing means and the image forming means, in which the image data memory means is composed of data compression/expansion means for compressing/expanding image data, and a memory for storing the compressed image data therein, and the control section monitors the available memory capacity and a memory data overflow signal is activated when the available memory capacity is reduced to not more than a predetermined value setting.

Further, in the third embodiment, it is possible that the control section of the image recording apparatus is configured to simultaneously execute both of reading of the image data to store the image data into the memory and reading of the image data to form an image. It is also possible that the control section is configured to first simultaneously execute reading of the image data and the image forming so as to obtain the first set of copies, then execute reading out of the stored image data from the memory to obtain additional N−1 sets (N is an integer not less than 1) of copies.

Further, in the third embodiment, it is possible that the post-processing means is configured to distribute each set of the recording sheets, on which images are formed, to a respective predetermined space to be accommodated.

Still further, it is preferable that the control section is configured to suspend reading of a document in accordance with the memory data overflow signal, to read out the image data, stored until the suspension, from the memory to image-form N−1 sets of copies, to sort out the copies to the accommodators, to reset the memory, and to simultaneously execute both of reading of the image data to store the image data from the leading end of the document page, where the image data overflow signal was caused to be generated, into the memory and reading of the image data to form an image.

According to the image recording apparatus of the first embodiment structured as described above, the following operations are carried out. The compression means is provided in the apparatus in which: one of a plurality of compression ratios is selected and compression-stored in the memory in the case where image data, obtained when the document image is read out by the reading means, is compressed and stored in the memory, and in which the read out image data is expanded according to the compression ratio selected at the time of compression storage when the image data is read from the memory at the time of image formation. The control section in the image recording apparatus automatically changes the compression ratio when the memory data overflow is detected. The automatic document feeding apparatus is set in such a manner that the order of the document sheets is returned to its initial order from the first sheet so that the document reading is repeated from the first, and image data reading of the document image into the memory is completed. In such cases, since operations are automatically conducted, it is not needed for the operator to manually conduct the operations, resulting in a large saving of personnel time. Further, in this case, as a countermeasure for memory data overflow, the entire document sheets are read at a high compression ratio. Accordingly, different from cases where the number of document sheets are reduced, in which after-treatment is potentially troublesome, it is not necessary to severely consider copied page missing or disordered sheets.

Further, in the image recording apparatus of the second embodiment structured as described above, the control section of the image recording apparatus has an operation section to specify a manual selection mode for manually selecting the compression ratio, and an automatic selection mode for automatically selecting the compression ratio. Normally, selection of the compression ratio is set to the auto selection mode, and the reading operation is effectively conducted. When image recording with the lower compression ratio, that is, high quality image recording is required, selection of the compression ratio can be set to the manual selection mode which is manually selected by the operator. In such cases, when the document image is read again, the operator can judge whether the compression ratio needs to be increased, or whether the number of document sheets to be read needs to be decreased, depending on the characteristics of document. Accordingly, an image recording apparatus with superior operation property can be realized.

According to the image recording apparatus in the third embodiment, the control section of the image reading apparatus suspends reading of a document when the memory data overflow signal is detected, reads out the image data, stored until the suspension, from the memory to image-form N−1 sets of copies, sorts out the copies to the accommodators, resets the memory, and simultaneously resumes both of reading of the image data to store the image data from the leading end of the document page, where the image data overflow signal was caused to be generated, into the memory and reading of the image data to form an image. In this case, the operation is proceeded automatically; therefore, it is not necessary to have attendance of the operator and a remarkable labor saving effect is obtained. The easy-operation image recording apparatus is obtained because the operation "to reduce the number of document pages", which require a complicated post-processing determination, is unnecessary, and the problems such as an omission of copied pages or a discontinuity of page number do not occur.

DETAILED DESCRIPTION OF THE INVENTION

The first embodiment of the present invention will be described below.

Figure 1:
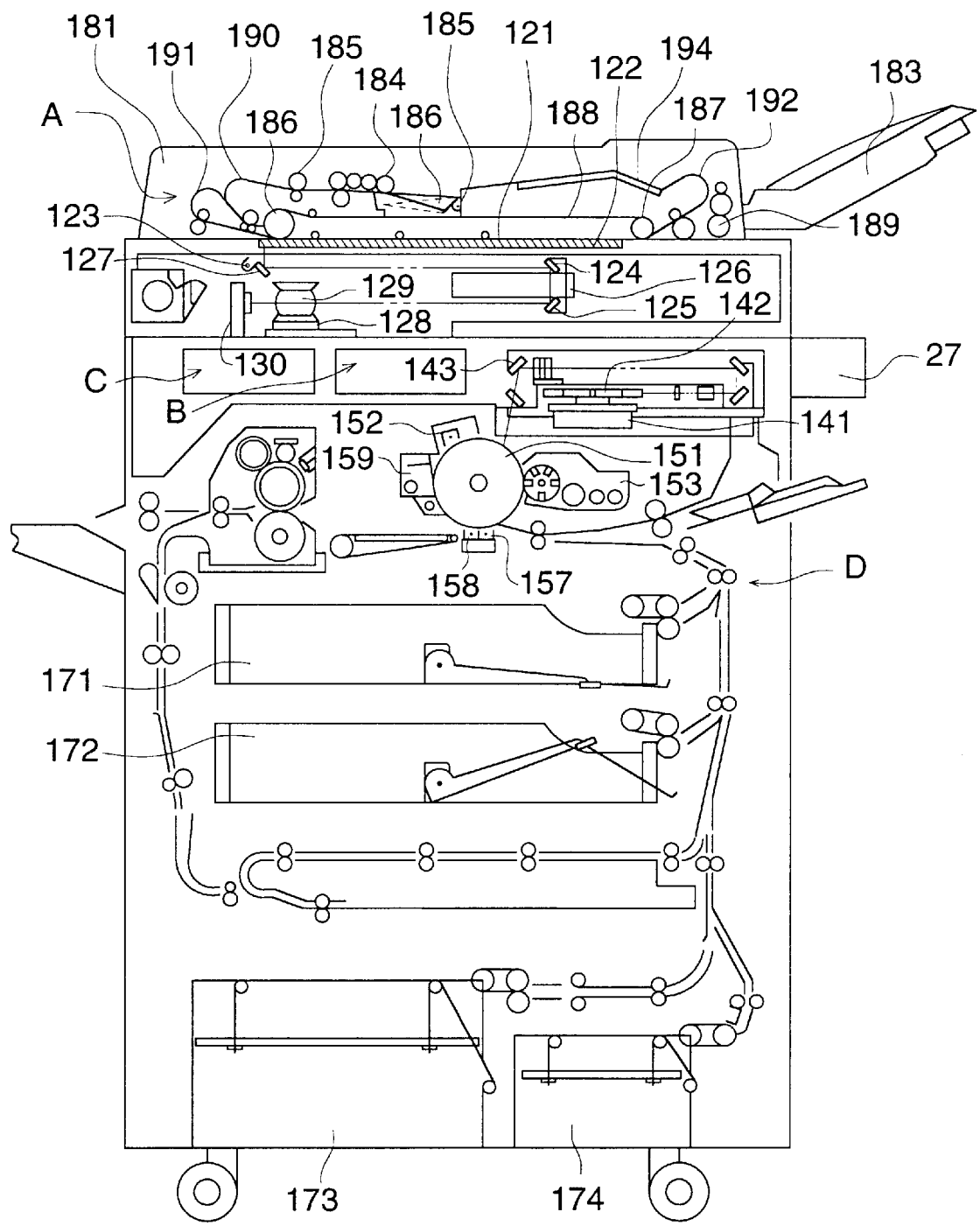
FIG. 1 is a view showing the entire structure of a monochrome digital copier of the first embodiment.

FIG. 1 is a view showing the entire structure of a monochrome digital copier of this example.

In FIG. 1, the monochrome digital copier is comprised of an image reading section A, an image processing section B, an image memory section C, and an image forming section D. The image reading section A corresponds to an image reading means, the image processing section B corresponds to an image processing means, the image memory section C corresponds to an image data memory means, and the image forming section D corresponds to an image forming means.

In the image reading section A, a document 121 is placed on a platen 122, and irradiated by a halogen light source 123 provided on a carriage which slides on slide rails. A moving mirror unit 126, on which a pair of mirrors 124 and 125 are provided, slides on the slide rails, and introduces a reflected light from the document 121 on the platen 122, that is, an optical image, to a lens reading unit 128.

The lens reading unit 128 is comprised of an image formation lens 129 and a CCD line sensor 130.

The optical image corresponding to the image on the document 121 which is reflected and transmitted by mirrors 124, 125 and 127, is converged by the image formation lens 129, and formed on the light receiving surface of the CCD line sensor 130. The optical images on lines are sequentially, photoelectrically converted into electrical signals by the CCD line sensor 130.

After the image signal of the document image, read out in the image reading section A, that is, image data, is subjected to image processing such as density conversion, filter processing, magnification processing, and γ-correction, the processed image data is outputted to the image forming section D through the image memory section C. The image forming section D performs image formation on a recording sheet corresponding to the inputted image data by a laser printer using electrophotographic technology.

That is, in the image forming section D, a laser beam generated by a semiconductor laser, not shown in the drawing, is modulated according to the image signal. This laser beam is used for rotational scanning using a polygonal mirror 142 rotated by a drive motor 141, and its optical path is bent by a reflection mirror 143 through an fθ lens, not shown in the drawing. Then, the laser beam is projected on the surface of a photoreceptor drum 151, and forms an electrostatic latent image on the uniformly charged photoreceptor drum 151.

Further, a charger 152 for uniformly charging the photoreceptor drum 151, a developing unit 153, a transfer electrode 157, a separation electrode 158, a cleaning device 159, and a fixing device are provided in the apparatus. An electrostatic latent image formed on the photoreceptor drum 151 is developed into a toner image by the developing unit 153, the toner image is transferred onto a recording sheet, fixed, and a copied document image is obtained.

Recording sheets are respectively stocked in cassettes 171 to 174 for each size, and a recording sheet is pulled out from one of the cassettes 171 to 174 corresponding to the specified recording sheet size. The recording sheet is fed to the photoreceptor drum 151 by a recording sheet conveyance mechanism comprised of a plurality of conveyance rollers and conveyance belts.

In the monochrome digital copier in this example, a circulation type automatic document feeding apparatus for automatically conveying the document onto the platen 122, (R-ADF) 181, is provided in the image reading section A.

In the automatic document feeding apparatus 181, when a plurality of document sheets are stacked and set on the document tray, the conveying direction of each document sheet is reversed by the first reverse section 190, and each document sheet is automatically conveyed into a predetermined position on the platen. The read out document sheet is removed from the platen 122, and delivered onto a document delivery tray 183.

In the R-ADF 181, the following operations are carried out. It sequentially sends the single-sided document, on which an image exists, and reads the image on the document; further, it takes out any double-sided document and sends it onto the platen 122; after the image on one side of the document sheet has been read, the document sheet is moved in the reversed direction; its conveying direction is reversed by the second reverse section 191 so that the document sheet is upside-down, and the reversed document sheet is sent to a predetermined position on the platen 122 so that image information on the rear surface of the document sheet can be read out.

Further, the R-ADF 181 sends the read out document sheet to the third reverse section 192 instead of directly delivering it onto the document delivery tray 183, and the document sheet is reversed so as to be upside down and stacked on a document reverse tray 194. When a switching plate 186, which is rotated around a fulcrum 185, is moved from the lower position (the position shown by a broken line in the drawing) to an upper position (the position shown by a solid line in the drawing), the first document sheet is re-fed from a stack of document sheets, in which the initial document reading has been completed, and the second document reading starts.

The R-ADF 181 is comprised of the following units and sections in order to automatically convey the document: feeding rollers 184 for conveying individual document sheets placed on the document tray; intermediate rollers 185; a drive roller 200 and a driven roller 187; a conveyance belt 188 wound around the drive roller 186 and the driven roller 187; the first reverse section 190 comprised of delivery rollers 189 and a guide plate; the second reverse section 191; and the third reverse section 192.

Figure 2:
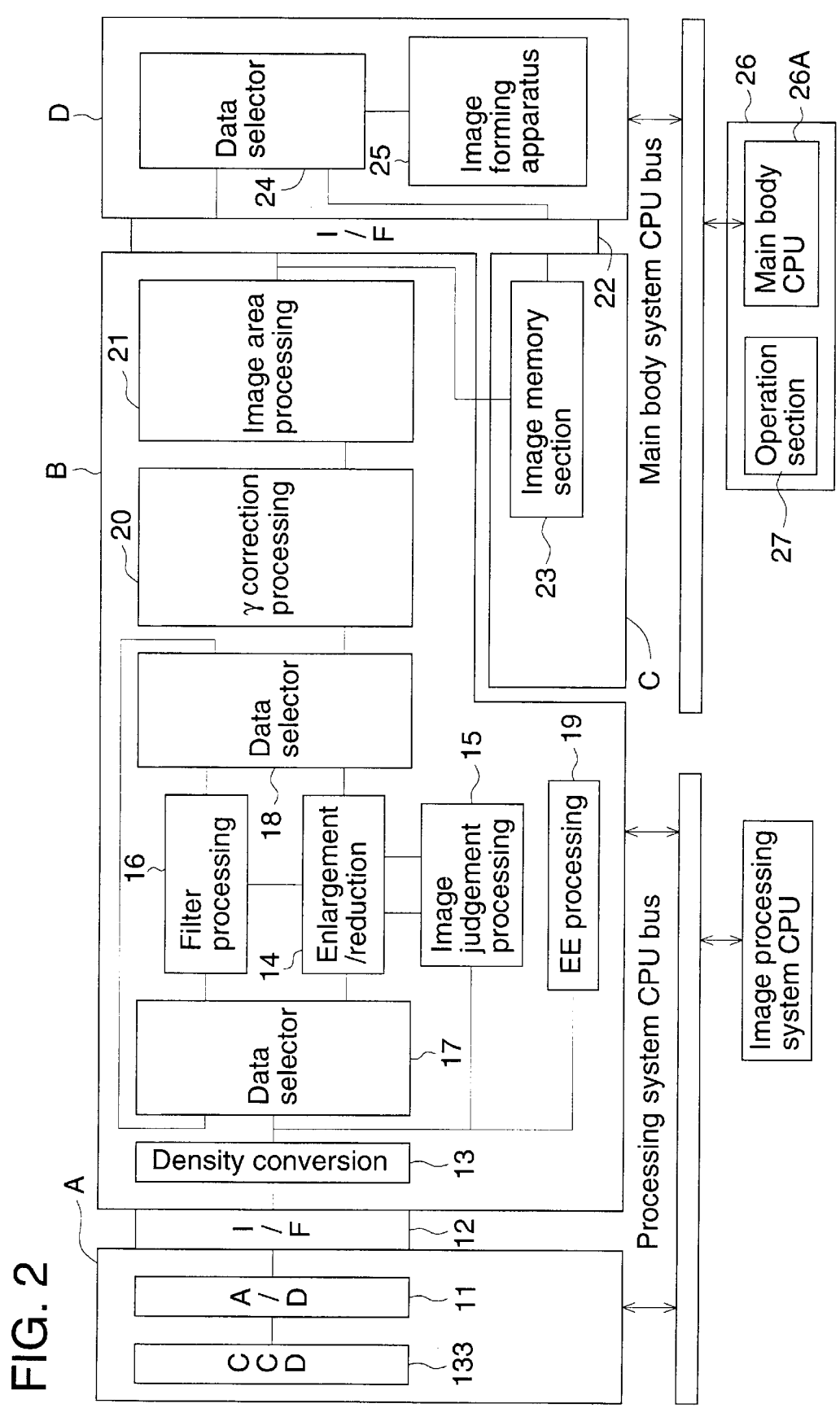
FIG. 2 is a block diagram showing a circuit structure of the first embodiment.

Referring to the block diagram in FIG. 2, the circuit structure of the monochrome digital copier comprised of image reading section A, image processing section B, image memory section C and image forming section D, will be described below.

Initially, in image reading section A, an analog signal outputted from the CCD line sensor 130 is converted into a digital image signal (image data) by an A/D converter 11, and outputted to image processing section B through an interface 12.

The digital image signal (brightness information) inputted into image processing section B is converted into density information by the density conversion section.

Then, magnification processing according to the consumer's designation is performed in an enlargement/reduction section 14.

In the image judgement processing section 15, character images and photographic images are discriminated based on density information converted in the density conversion section. According to the result of the discrimination, filter characteristics in the filter processing section 16 are set, and spatial filter processing is carried out in the filter processing section 16.

In this connection, the image judgement processing section 15 corresponds to the image judgement means and processing characteristic changing means, and the discrimination of character images and photographic images includes that of the character image area and the photographic image area in mixed images, having both character portions and photographic portions.

A pair of data selectors 17 and 18 are provided in order to change the processing from the filter processing to magnification processing, or the reverse, corresponding to the designation of the enlargement/reduction. The change between the filter processing and the magnification processing is performed to prevent moire fringes in dot images which are sometimes generated in images at the time of reduction processing.

In the EE processing section 19, histogram data is obtained in order to secure features of the document image, from image information given by pre-scanning which is carried out before primary scanning at the time of document scanning. The CPU in the image processing system, not shown in the drawing, sends appropriate γ-correction data to γ-correction processing section 20 according to the histogram data.

Image data (density data), which has been subjected to filter processing/magnification processing, is outputted to an image area processing section 21 after γ-correction processing has been conducted corresponding to characteristics of an image forming apparatus 25, which will be described later, in the γ-correction processing section. In the image area processing section 21, area processing such as border-erasing or fold-erasing, is carried out as well as extraction of the effective image area of the document.

As described above, image processing required for image formation is performed totally, and image data (density information), which is in the final output condition to the image forming apparatus, which will be described later, is outputted to the image forming section D through the image memory section C and an interface 22.

The image memory section C stores the inputted image data for a plurality of pages simultaneously in an image memory 23.

The image forming section D has a function in which an image is formed in real time on the recording sheet when the document is read out. It also has a function in which the image is formed after the stored image data has been read out in an arbitrary order, after a short while.

In this embodiment, the function in which image data, that is obtained by reading the document image and by conducting all the required image processing, is stored in the memory for every page, and in which the stored image data is selectively read out after a little while so that the image is formed, is called an electronic RDH (Recycle Document Handler) function.

In the image formation section D, an image forming apparatus 25 such as a laser printer and also an image memory section (image data storing means) C for storing the image data so as to be rewritable, in order to realize the electronic RDH function, are provided. Further, a data selector 24 to switch the electronic RDH function and an ordinary real time image formation function, is also provided in the image formation section D.

The data selector 24 selectively outputs either the image data outputted from the image memory section C, or the image data sequentially outputted from the image processing section B corresponding to the reading out operation, to the image forming apparatus (laser printer) 25. That is, image data is stored in the image memory section, and image data read out from the image processing section B and image data read out from the image memory section C, which are selectively outputted by the data selector 24, are processed equally in the image forming apparatus 25, and image formation is performed.

In the image processing section B, the image processing system CPU controls the processing. In the image memory section C, and the control section 26 and the operation section 27 in the image forming section D, the main body CPU controls the processing.

Figure 3:
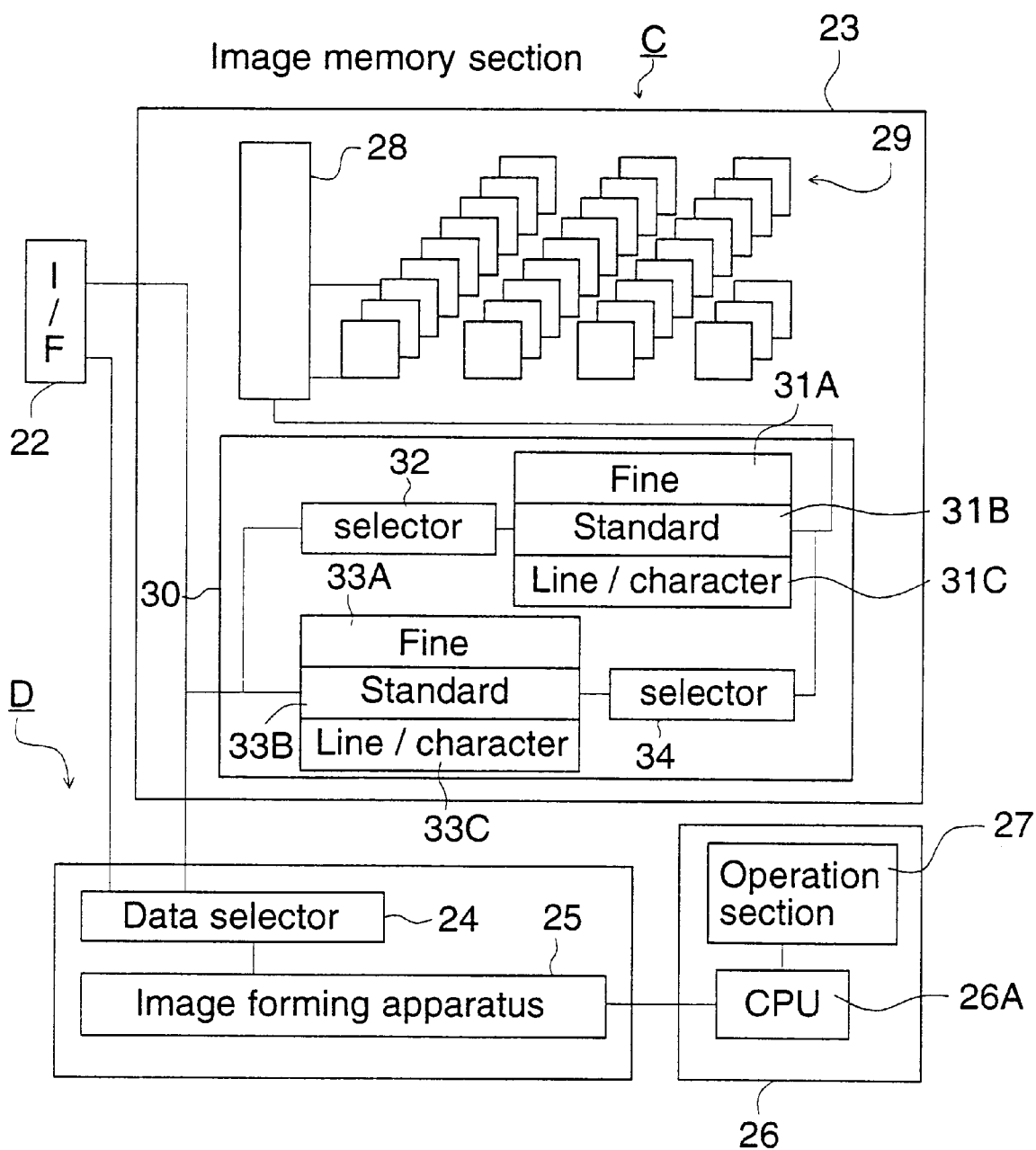
FIG. 3 is a block diagram showing an image memory section in the first embodiment.

Next, referring to FIG. 3, the structure of the image memory section will be described.

The image memory 23 is comprised of: an image data write and read means 28 including an address register, a data buffer and a latch memory for holding read/write signals; a memory 29 for storing the compressed image data for each page; and a data compression/expansion section 30 for compressing the image data in order to write the image data into the memory, and for expanding the compressed image data read out from the memory in order to restore it. The data compression/expansion section 30 is comprised of: a data compressor 31A appropriate for storing fine image quality data such as photographs or the like; a data compressor 31B for compressing the data at a standard compression ratio; a data compressor 31C for compressing the data at a higher compression ratio appropriate for storing line images and characters; a selector 32 for selecting any of these data compressors; a data expander 33A appropriate for restoring the compressed image data read out from the memory to fine image quality data at a smaller expansion ratio; a data expander 33B for restoring the compressed image data to standard image quality data at a standard expansion ratio; a data expander 33C for restoring line images or characters at a higher expansion ratio; and a selector 34 for selecting one of these expanders. The control section 26 of the image forming apparatus 25 includes the CPU 26A and the operation section 27, and the operation section is used to set the initial compression ratio.

Figure 4:
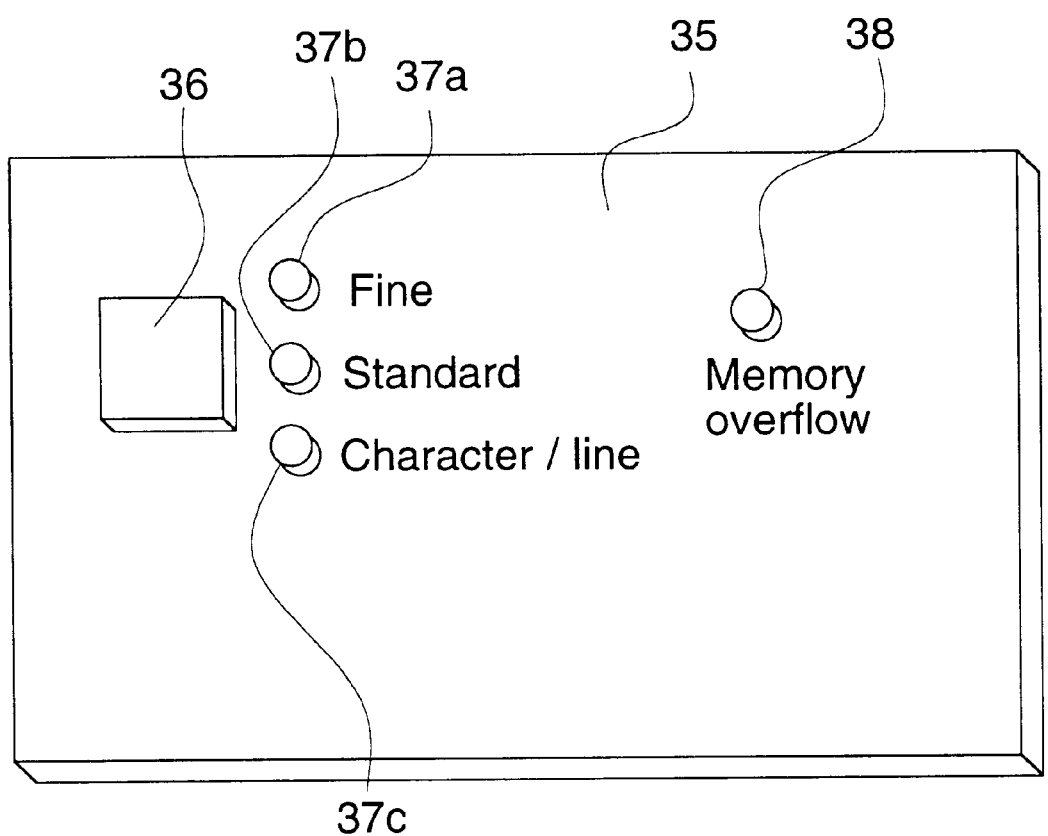
FIG. 4 is an illustration of an operation panel of a control section of the first embodiment.

FIG. 4 is an illustration showing the operation panel 35 of the operation section 27.

An image quality selection button 36 specifies initially a compression ratio at the time of image data reading, and the specified compression ratio is displayed by LEDs 37A, 37B and 37C. An LED 38 displays the memory data overflow.

Figure 5:
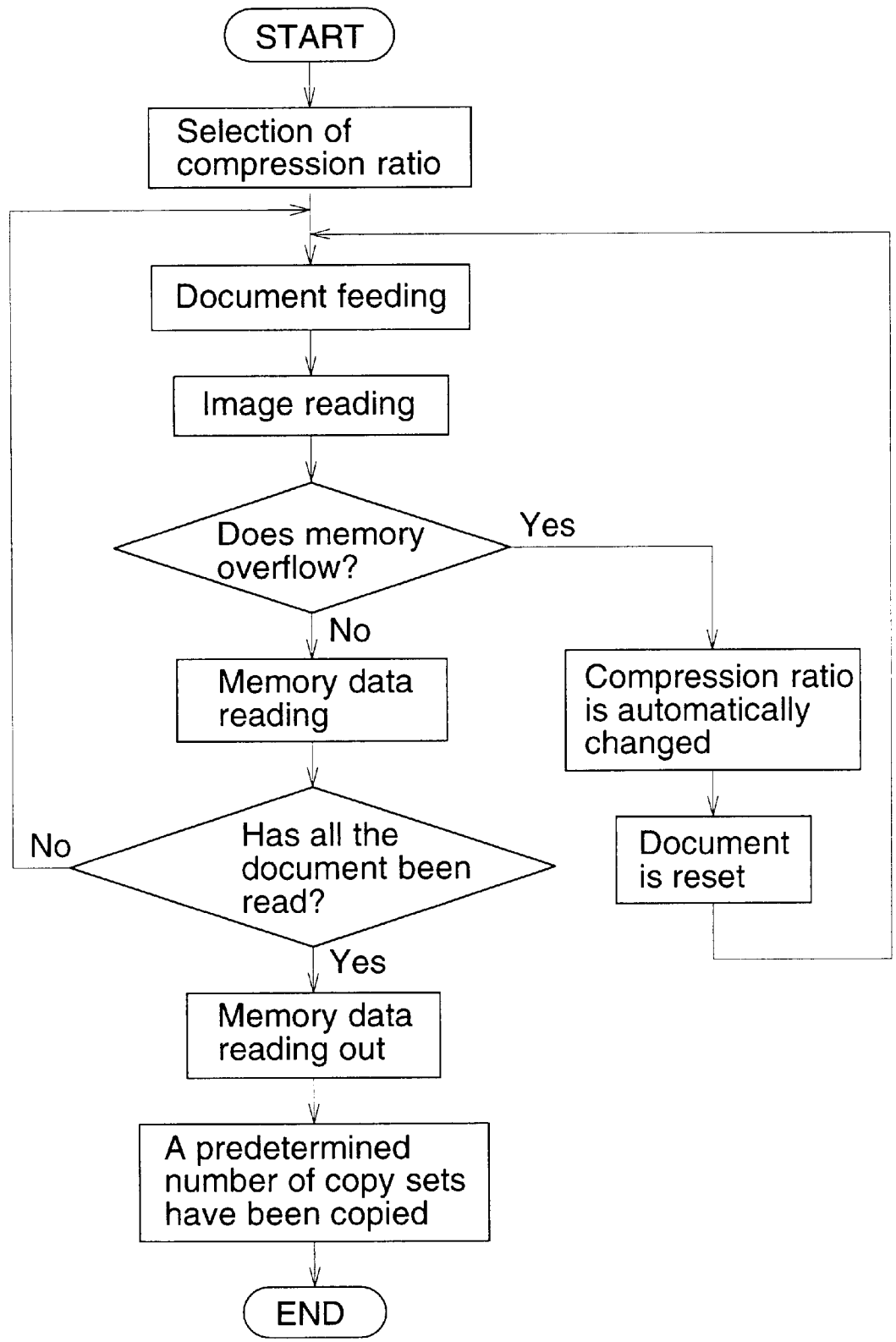
FIG. 5 is a flow chart of the first embodiment when memory data overflows.

FIG. 5 is a flow chart showing operations of an embodiment of the first invention according to the present invention.

Initially, a standard compression ratio is specified by an image quality selection button 36 in the operation section 27; a document 121 is placed on a document table of the automatic document feeding apparatus 181; a start button, not shown in the drawing, is pressed; and feeding operation of the document 121 starts. Image data, which has been read in the image reading section A, is compressed at a specified compression ratio, and is sequentially written in the memory 29. The above operations continue until the entire document sheets on the document table are fed. After that, image data is read from the memory 29, and the required volumes of sheets are copied in the image forming section.

When image data overflows the memory capacity, the control section 26 automatically switches the compression ratio to higher level for line images and characters, and the document on the automatic document feeding apparatus is reset as follows. That is, document reading stops; the document sheets are only fed so that the order of the document sheets returns to the original one from the first page; and the position of the switching plate 186 is switched from the position shown by a broken line to the position shown by a solid line so that the first document sheet can be read. The reading operation restarts, and document reading, image data compression, and image data storing in the memory are performed.

Figure 6:
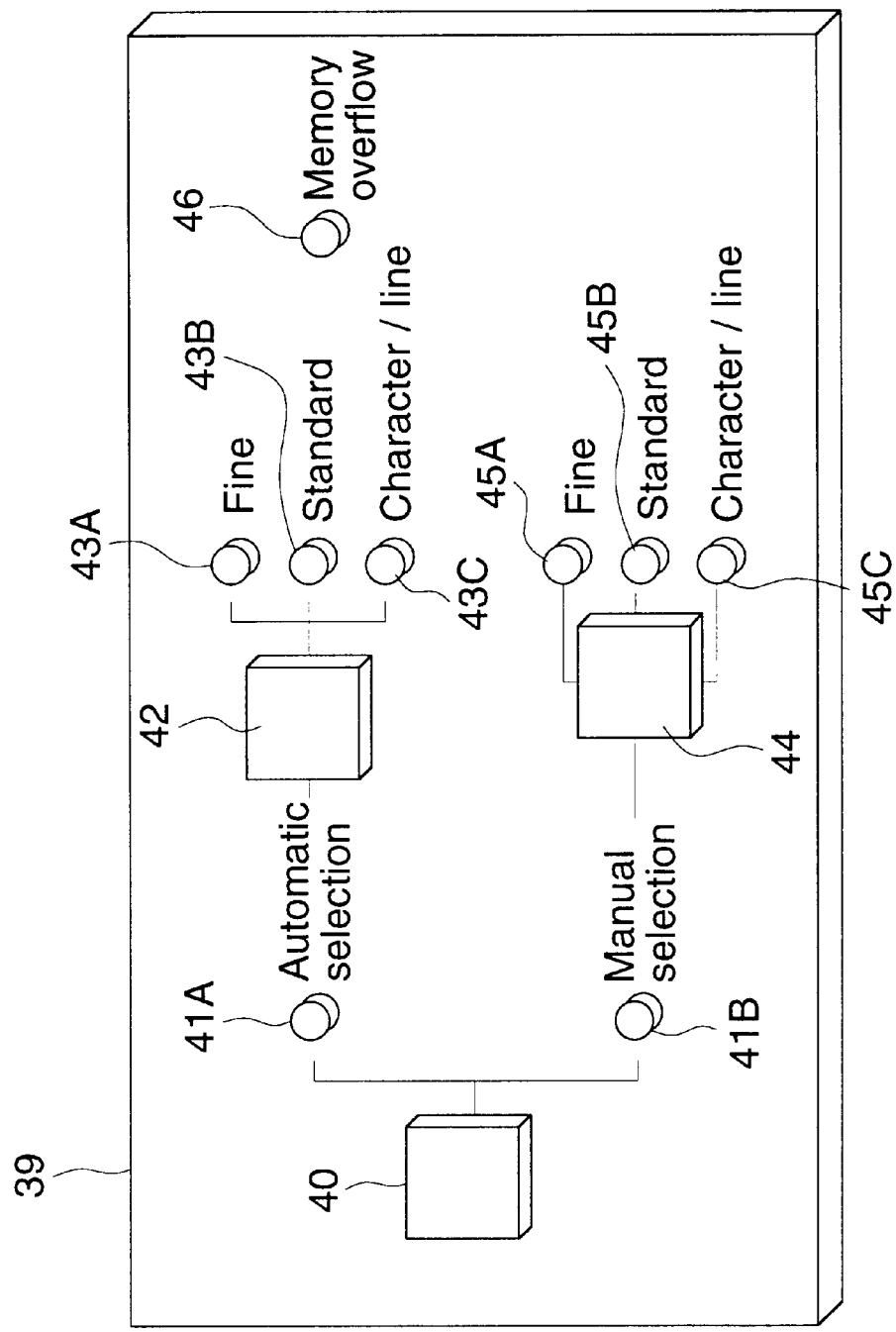
FIG. 6 is an illustration of the operation panel of the control section of the second embodiment.
Figure 7:
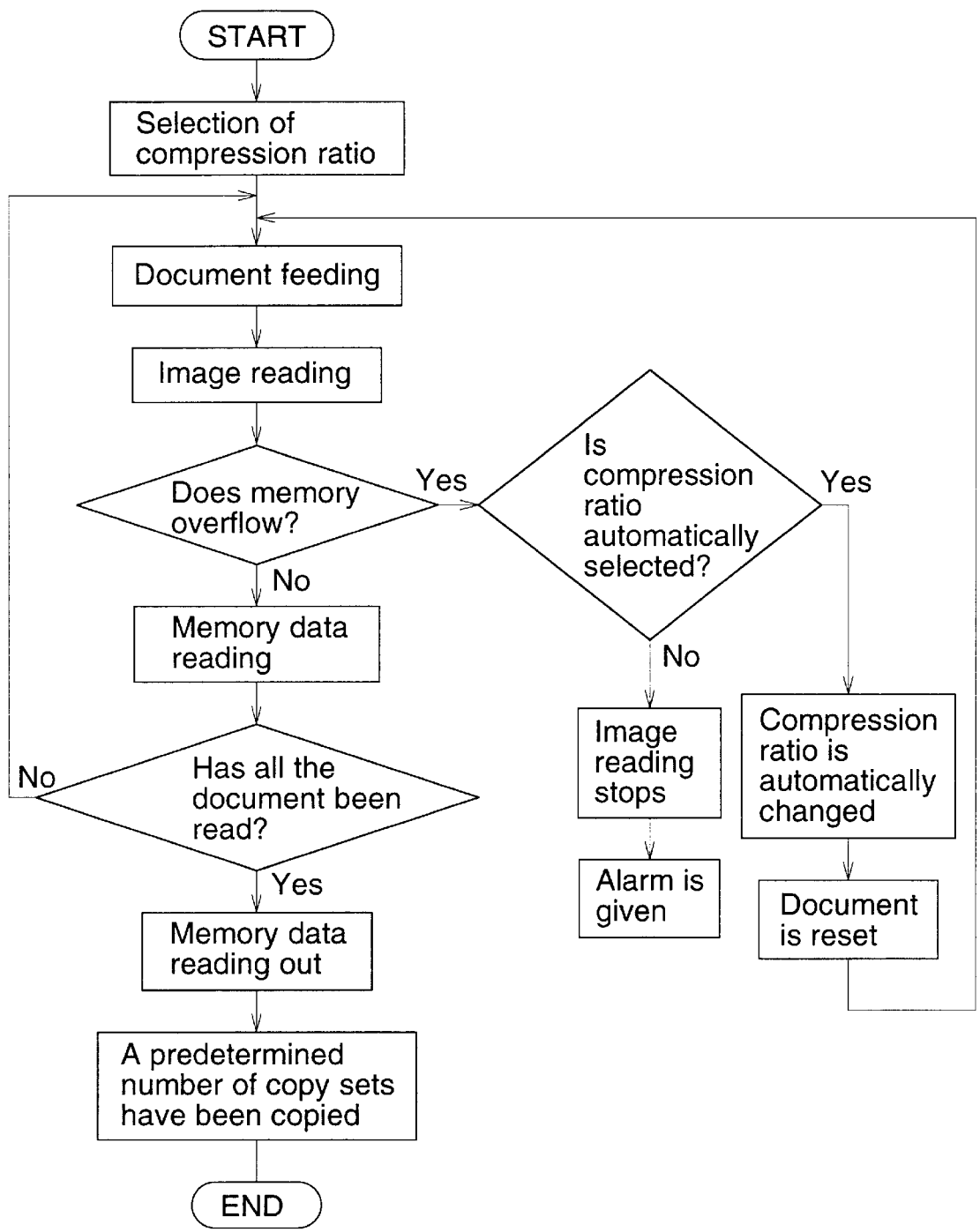
FIG. 7 is a flow chart when memory data overflows, in the second embodiment.

Referring to FIGS. 6 and 7, the second embodiment of the present invention will be described below.

FIG. 6 is an illustration of the operation panel 39 of the second embodiment. A mode designation button 40 sets the automatic selection mode or the manual selection mode. LEDs 41A and 41B display the designated mode.

A compression ratio selection button 42 specifies an initial compression ratio in the automatic selection mode. LEDs 43A to 43C display the designated compression ratio and the compression ratio which is being read. A compression ratio selection button 44 is used when the operator designates the compression ratio at the time of manual selection, and the selected compression ratio is displayed by LEDs 45A, 45B and 45C. An LED 46 is a display used when image data overflows the memory capacity.

FIG. 7 is a flow chart of operations of the embodiment.

Description for operations in common with those in the flow chart shown in FIG. 5 is neglected, and operations after the detection of the memory data overflow will be described below. The control section 26 confirms whether or not the compression ratio designated by the mode designation button 40 on the operation panel 39 is in the automatic selection mode. When the compression ratio is in the automatic selection mode, the compression ratio is automatically changed so as to be increased one step larger. Then, document reading stops, the order of the document sheets is returned to the initial one from the first sheet, and the document reading restarts. When the compression ratio is in the manual selection mode, image reading stops for a short while, and a memory overflow alarm is activated. The operator determines whether the number of document sheets is decreased so that image reading restarts, or the compression ratio is increased and image reading is restarted, based on this alarm. Normally, when the operator manually designates the compression ratio, the system judges that high quality image reproduction is specified in accordance with the operator's intention.

As described above, the image recording apparatus according to the first and second embodiments of the present invention can realize man-power saving for the following reasons: when the memory capacity for the image data is not available, that is, when the image data overflows the memory capacity, the compression ratio is automatically changed; the order of the document sheets is returned to the initial one from the first sheet; the image data reading operation is performed from the initial document sheet; and therefore, it is not needed for the operator to manually operate the recording apparatus during whole operations of the apparatus. In this case, as a countermeasure for the image data overflow, all sheets of the document are read at the higher compression ratio. Accordingly, different from the case where the number of the document sheets is decreased, there is no possibility that any of copying sheets is missed, or the order of copying sheets is incorrect.

Further, in the recording apparatus according to the present invention, the control section of the image recording apparatus has an operation section which can specify a manual selection mode to manually select the compression ratio, and an automatic selection mode to automatically select the compression mode. Accordingly, normally, the selection mode of the compression ratio is set to the automatic selection mode, and reading operations are effectively performed. When image recording at a smaller compression ratio, that is, high quality image recording is required, the selection mode can be set to the manual selection mode by the operator. In this case, when image data overflows the memory capacity, and document image is read again, the operator can select whether image recording should be performed at a higher compression ratio, or the number of document sheets to be read should be decreased. Accordingly, a highly operable image recording apparatus can be realized by the present invention.

The third embodiment of the present invention will be described below.

Figure 8:
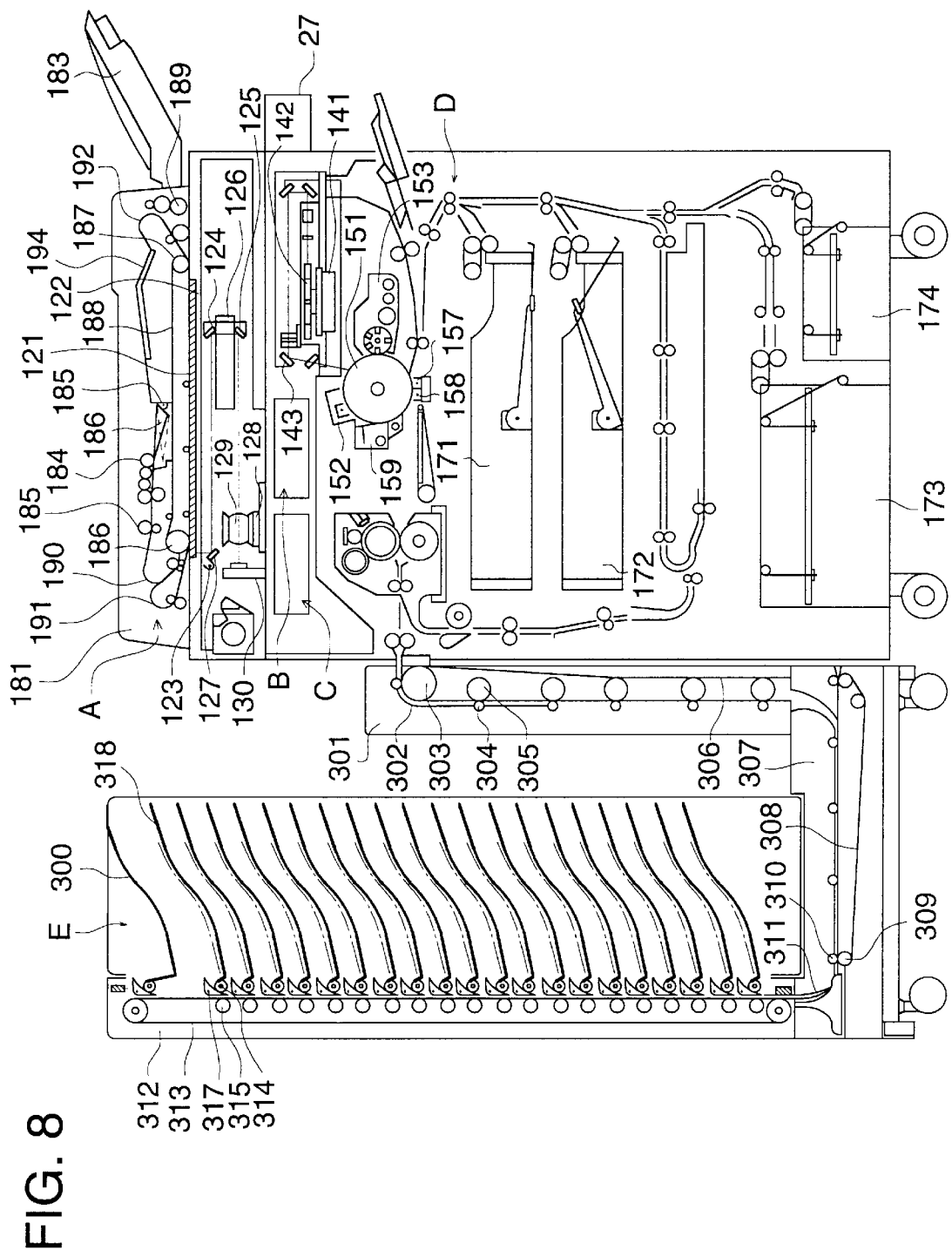
FIG. 8 is a view showing the entire structure of a monochrome digital copier of the third embodiment.

FIG. 8 is an illustration of the overall configuration of the monochrome digital copier according to the third embodiment.

In this FIG. 8, the monochrome digital copier is comprised of an image reading section A, an image processing section B, an image memory section C, an image forming section D, and a post-processing section (sorter) E. The image reading section A to the image forming section D are configured the same as in the first and second embodiments. The post-processing section E corresponds to the post-processing means.

For the post-processing section E, the sorter 300 as the post-processing means is used. The recording sheet, which is discharged from the fixing device 160 of the main body copier, is conveyed into the vertical conveyance section 301 and directed by the guide 302, then conveyed to the horizontal conveyance section 307 with the feeding rollers 303, 304, and 305, and the conveyance belt 306. The recording sheet is also conveyed by the conveyance belt 308 and the feeding rollers 309 and 310, directed by the guide 311, and accommodated in the distribution accommodation section 312. The recording sheet is further conveyed by the conveyance belt 313 and the feeding rollers 314 and 315, and guided by the distribution guide 317, which is driven by the unillustrated solenoid, so as to be accommodated on the predetermined bin 318.

Figure 9:
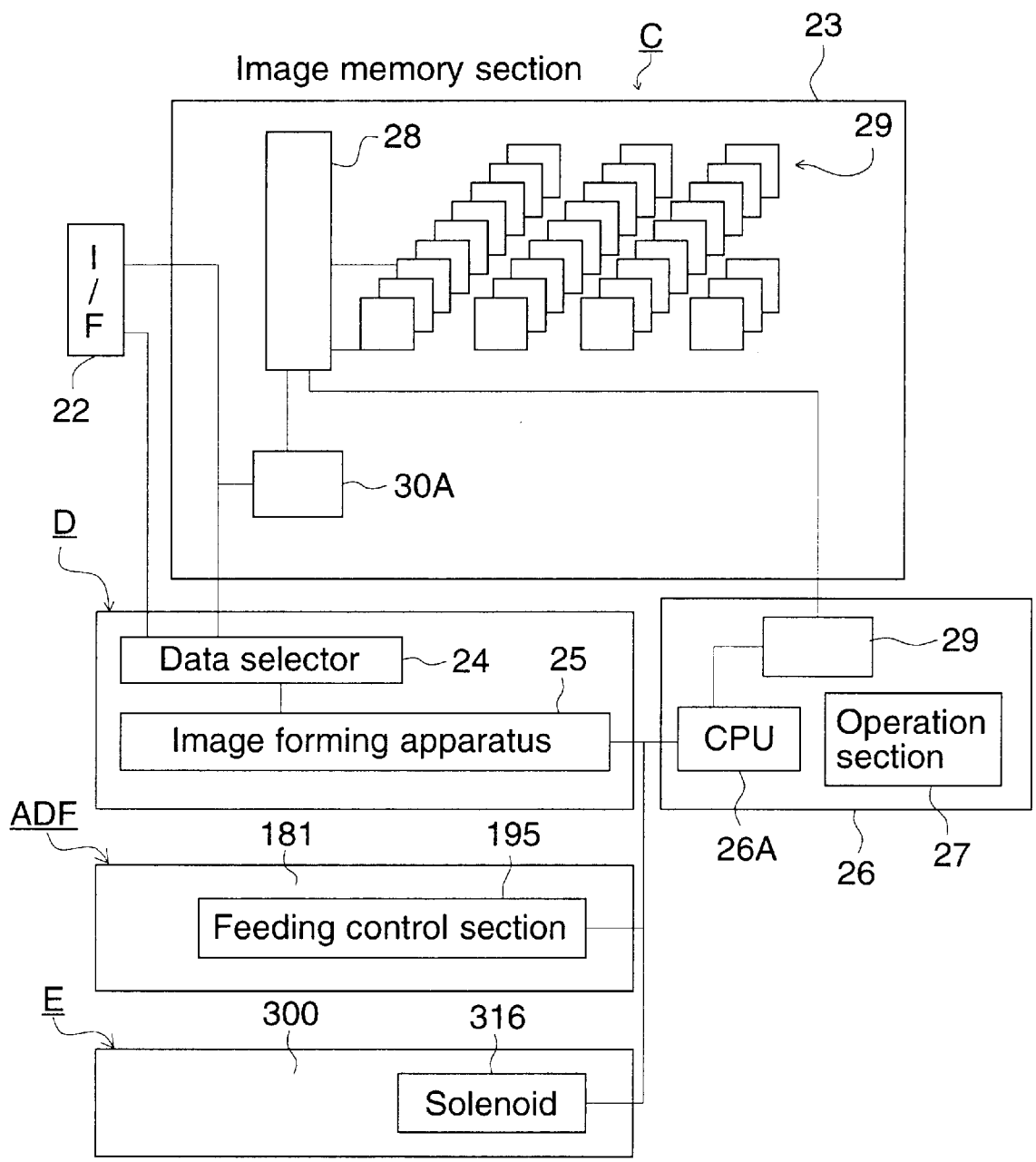
FIG. 9 is a block diagram showing an image memory section in the third embodiment.

Next, the configuration of the image memory section will be explained with FIG. 9.

The image memory section 23 comprised of: an image data write and read means 28; which includes an address register, a data buffer, and a latch memory for holding read/write signals; a memory 29 for storing compressed image data for each page; and a data compression/expansion processor 30A for compressing image data in order to write the image data into the memory, and for expanding the compressed image data read out from the memory in order to restore it. The control section 26 of the image forming apparatus 25 includes the CPU 26A and the operation section 27, and the operation section 27 is used for setting the size of the recording sheet, the use of ADF (automatic document feeder), the attribute of the document whether one-sided or two-sided, the attribute of the memory whether the image data is stored or not, and the use of post-processing means. The CPU 26A of the control section 26 in the image recording apparatus controls the conveyance control section 195 of ADF 181 in addition to the image forming apparatus, and it controls the motion of the solenoid 316 which drives the distribution guide 317 in the sorter 300 of the post-processing means.

Figure 10:
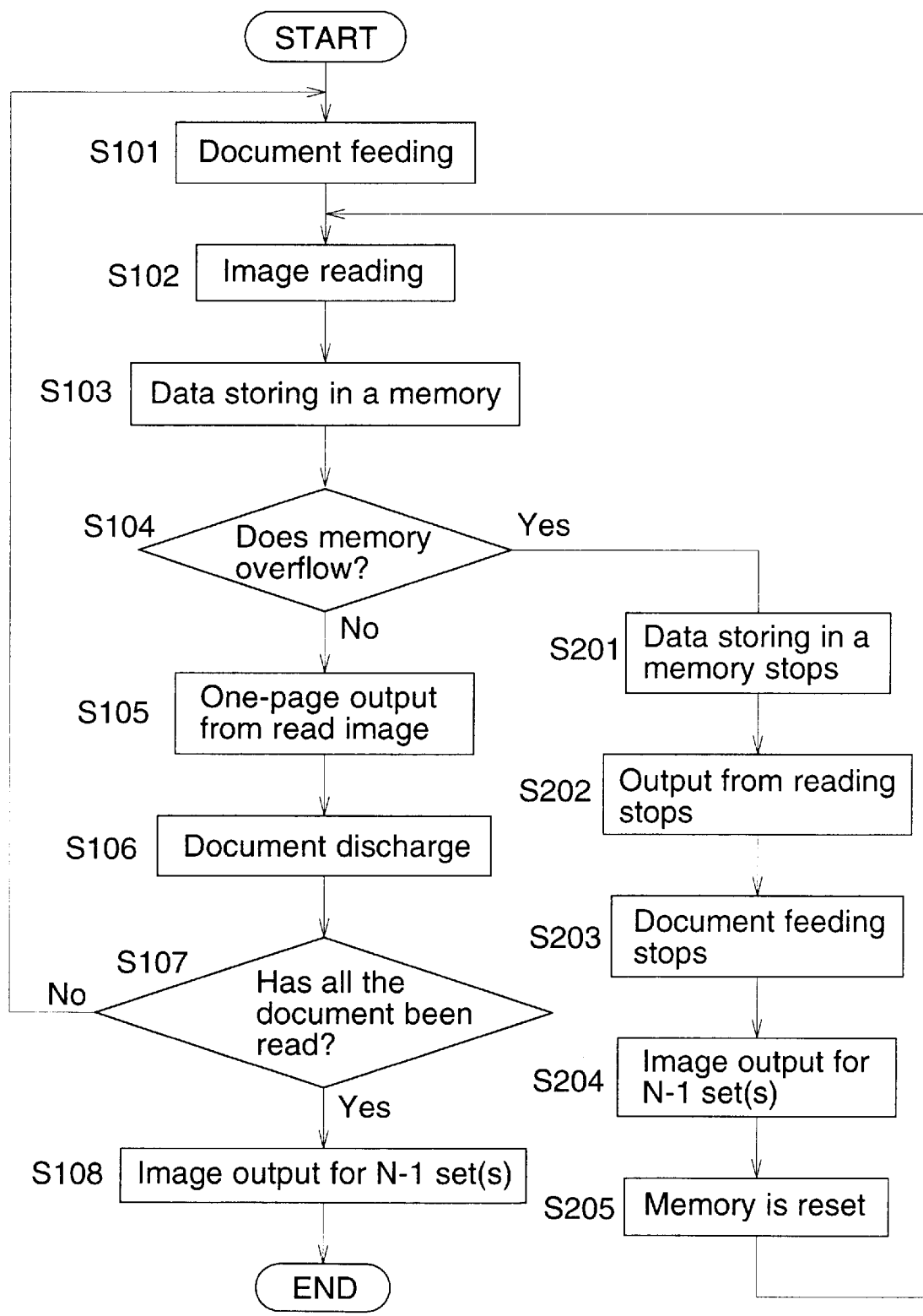
FIG. 10 is a flow chart of the third embodiment when memory data overflows.

FIG. 10 is a flow chart of operations of the third embodiment.

In use with the operation section 27, the real time copying mode, in which data storing operation into the memory and image forming operation are simultaneously executed with ADF, is selected before the operation, and the number of copying sets is inputted.

When the start button, which is not illustrated, of the operation section is impressed, one page of the documents is conveyed to a predetermined position on a platen glass by ADF and stopped there. An image reading operation is started and output from CCD is processed image signal wise so as to obtain an image data. The image data is stored in the memory and the remaining space of the memory is calculated simultaneously so as to determine whether the remaining space is not more than a predetermined value. When enough space remains in the memory, the image data is sent to the image forming section and the image data for one page is image formed. After the storing operation of the image data for one page and the image forming operation of the image data for one page, ADF is driven to discharge the document. Until the end of the document discharge is detected, the control steps from S101 to S106 are repeated, and the storing operation of the image data and the copying operation for the first copy set are progressed. The recording sheets, on which the images are formed, are orderly accommodated in the first bin of the sorter, which is the post-processing means, so as to obtain the first copy set.

In the step S107, ADF stops when the end of the document reading process is detected. Instead, the step S108 is executed in the manner that: the stored image data is read out from the memory; a corresponding image is formed; recording sheets are sorted and accommodated in the second bin to Nth bin of the sorter; and the copying operation for the second to Nth sets (equal to N–1 sets) is finished. In result, the copies from the first set to the Nth set are obtained in the sorter 300.

The operation, when the memory data overflow occurs, will be explained below.

As shown in the steps from S201 to S203, when the CPU 26A detects the memory data overflow, the writing operation of the image data into the memory is stopped and the output operation of the image data to the image forming section is also stopped. It is discontinued to feed the document, of which the image is being read. In this case, it is possible to forbid the image forming operation of the page, with which the memory data overflow is consequently happened, by stopping the conveyance of the recording sheet instead of the step S202.

Next, as shown in the step S204, the images for N–1 sets of copies are outputted in response to the image data stored in the memory, and the copies from the second set to the Nth set are accommodated in the respective bins of the sorter 300. After that, as shown in the step S205, the memory 30 is reset and the memory is prepared for newly storing an image data. Here, the document, which is remained on the platen glass 122 without being discharged, is subjected to be read (S102), and the storing operation into the memory (S103) and the image output operation (S105) are executed so that the copying operation is restored. Here, the document, with which the memory data overflow is happened, is discharged (S106) and the next document is fed (S101) so as to go back to the normal processing routine. The above processing steps are all executed automatically without the work of an operator.

As explained above, according to the image recording apparatus of the third embodiment of the present invention, the image reading apparatus suspends reading of a document when no space to store remains in the memory or the memory data overflow signal is detected, reads out the image data, stored until the suspension, from the memory to image-form N–1 sets of copies, sorts out the copies to the accommodators, resets the memory, and simultaneously resumes both of reading of the image data to store the image data from the leading end of the document page, where the image data overflow signal was caused to be generated, into the memory and reading of the image data to form an image.

In this case, the operation is proceeded automatically; therefore, it is not necessary to have attendance of the operator and a remarkable labor saving effect is obtained.

Further, according to the present invention, the easy-operation image recording apparatus is obtained because the operation "to reduce the number of document pages", which require a complicated post-processing determination, is unnecessary, and the problems such as an omission of copied pages or a discontinuity of page number do not occur.

What is claimed is:

1. An image recording apparatus for recording images of a plurality of documents on recording sheets, comprising:

reading means for reading said images of said documents by photoelectrically converting said images so as to obtain image data corresponding to said images of said plurality of documents;

document feeding means for sequentially feeding said documents to said reading means; image processing means for processing said image data;

memory means for storing said image data, said memory means including:

data compression/expansion means for compressing and expanding said image data, wherein said data compression/-expansion means has a plurality of compression/expansion ratios;

selection means for selecting one of said plurality of compression/expansion ratios so that said image data, corresponding to each of said images, are subjected to compressing and expanding in the selected compression/-expansion ratio; and a single memory section for storing said image data corresponding to said images of said plurality of documents transmitted directly from said image processing means and compressed in the selected compression ratio by said data compression/expansion means;

image forming means for forming images, corresponding to selected image data selectively read out from said image data stored in said memory means, on said recording sheets; and control means for:

generating a memory data overflow signal when a remaining area of said single memory section is not more than a predetermined value, and controlling said document feeding means, said reading means, and said memory means in response to said memory data overflow signals so that said reading means stops reading said images and said document feeding means feeds back said documents to an original order, and so that after a changing of the compression/expansion ratio to a higher compression/expansion ratio from said plurality of compression/expansion ratios, said reading means reads said documents from a first one of said documents and stores image data to the single memory section in said higher compression/expansion ratio.

2. The apparatus of claim 1, wherein said data compression/expansion means comprises:

a plurality of data compressors and a plurality of data expanders corresponding to said plurality of compression/expansion ratios.

3. The apparatus of claim 1, further comprising:

a manual compression/expansion ratio inputting means for manually selecting one of said plurality of compression/expansion ratios.

4. The apparatus of claim 3, wherein when said memory data overflow signal is generated, said control means controls said memory means so that said memory means changes the compression/expansion ratio by said manual compression/expansion ratio inputting means.

5. The apparatus of claim 4, wherein said control means activates an alarm in response to said memory data overflow signal.

6. The apparatus of claim 3, wherein the compression/expansion ratio is selected by said manual compression/expansion ratio inputting means before forming images of said image forming means, and when said memory data overflow signal is generated, said control means controls said memory means so that said memory means automatically changes the compression/expansion ratio to the higher compression/expansion ratio.

7. The apparatus of claim 3, further comprising mode selecting means for selecting an automatic selection mode and a manual selection mode, and wherein when the automatic selection mode is selected, said control means controls said memory means so that said memory means automatically changes the compression/expansion ratio to the higher compression/expansion ratio when said memory data overflow signal is generated, and when the manual selection mode is selected, said control means controls said memory means so that said memory means changes the compression/expansion ratio by said manual compression/expansion ratio inputting means when said memory data overflow signal is generated.

8. The apparatus of claim 1, wherein when said memory data overflow signal is generated, said control means controls said memory means so that said memory means automatically changes the compression/expansion ratio to the higher compression/expansion ratio.

9. The apparatus of claim 1, wherein said document feeding means comprises a circulation type automatic document feeding apparatus wherein said documents are sequentially conveyed to said reading means, removed from said reading means, and discharged to a document delivery tray.

* * * * *